March 5, 1968 H. E. McCRAY ETAL 3,371,554
INTEGRAL CRANK AND PHASED COUNTERWEIGHT ARM
Filed Oct. 18, 1965 3 Sheets-Sheet 1

INVENTORS
HAROLD E. McCRAY
RUE S. HESTAND
by Kenneth Brown, Atty

March 5, 1968   H. E. McCRAY ET AL   3,371,554
INTEGRAL CRANK AND PHASED COUNTERWEIGHT ARM
Filed Oct. 18, 1965   3 Sheets-Sheet 2

INVENTORS
HAROLD E. McCRAY
RUE S. HESTAND
by Kimmler Brown, Atty

INVENTORS
HAROLD E. McCRAY
RUE S. HESTAND

United States Patent Office 3,371,554
Patented Mar. 5, 1968

3,371,554
INTEGRAL CRANK AND PHASED COUNTERWEIGHT ARM
Harold E. McCray and Rue S. Hestand, Pampa, Tex., assignors to Cabot Corporation, Boston, Mass., a corporation of Delaware
Filed Oct. 18, 1965, Ser. No. 497,084
4 Claims. (Cl. 74—600)

This invention is concerned with cranks having integral provision thereon for mounting counterweights so that their center of mass is somewhat offset from the wrist pin fittings with regard to angular position of rotation about the crankshaft. Of particular concern are such cranks having provision for readily varying the radial distance from the crankshaft axis of the center of mass of said counterweights.

One of the simplest and most popular methods of providing variable counterbalancing of a crankshaft has been to mount dead weights on the crank arm in such a way that they can be readily moved therealong when it is desired to change their effective radial distance from the crankshaft. For example, U.S. Patent No. 1,588,784 to Trout describes such a crank counterbalance in which separate weights are mounted on the upper and lower edges of the crank arm by means of grooves along which the weights can be made to slide when changes in their radial position are desired. However, a simple crank arm of this type permits very little variation in the radial direction of the line of variable wrist pin fittings since the permissible location for such fittings is of necessity limited to the central portion of the arm between the two grooves which run along the upper and lower edges.

It is a major object of the present invention to provide an integral crank and counterweight arm having a definite offset in angular position of rotation about the shaft of (1) the wrist pin fittings from (2) the effective torque arm of the counterweights and yet providing easy adjustment in the effective length of said counterweight torque arm. It is a further object to provide an improved wrist pin assembly which simplifies engagement and disengagement of the wrist pin with the crank and further minimizes interference between the wrist pin and the counterweight adjustment mechanism.

Other objects and advantages will be obvious or become apparent from the following detailed description and explanation which is given in conjunction with the accompanying drawings in which.

Figure 1:
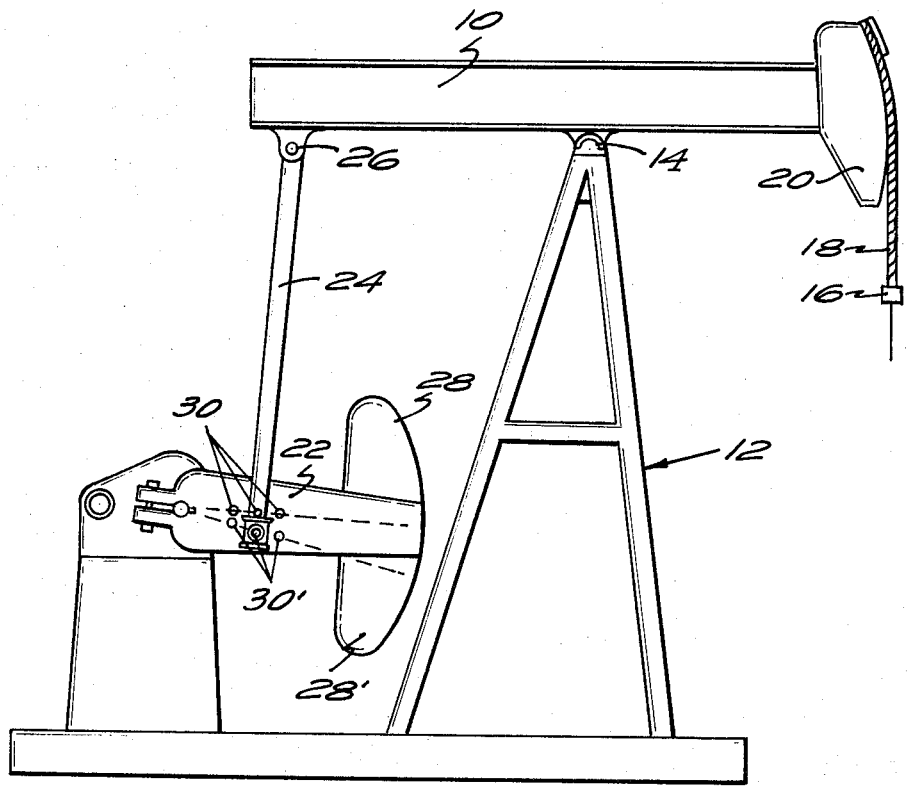
FIGURE 1 is a simplified and somewhat diagrammatic side elevation of a well pumping unit of the walking beam type illustrating the interference difficulties which would arise with a conventional crank if the wrist pin fittings were to be offset from the effective torque arm of the counterweights by any substantial acute angle of crank rotation.

One of the primary fields of application of the present invention is in crankshaft counterbalanced oil well pumping units of the type illustrated in FIGURE 1. As shown in said drawing, such units are characterized by a walking beam 10 rockably mounted on a sampson post frame 12 by means of saddle bearing 14. The pumping rod string of the well (not shown) is attached to one end of the walking beam 10 by means of hanger 16, cable 18 and horsehead 20. The drive system operates the unit through rotary crank 22 and pitman arm 24 which is pivotally joined by means of tail bearing 26 to the other end of walking beam 10. Direct crankshaft counterbalancing is provided by mounting weights 28 and 28' on upper and lower edges of crank 22.

As shown by the dotted lines on crank 22, the desirable feature of easy adjustability in positioning of these counterweights 28 and 28' therealong (for example, by slidably mounting them in undercut edge grooves as suggested in U.S. Patent No. 1,588,784) can readily be provided when the wrist pin fittings are located in line with the effective torque arm of the counterweights as indicated by reference numeral 30. However, when the wrist pin fittings are located as indicated by reference numeral 30' in order to provide a rotational offsetting or phasing between the effective crank arm and the effective counterweight torque arm, serious interference is likely to occur between said wrist pin fittings 30' and the adjustment mechanism for the positioning of the counterweight along the lower edge of the crank.

Figure 2:
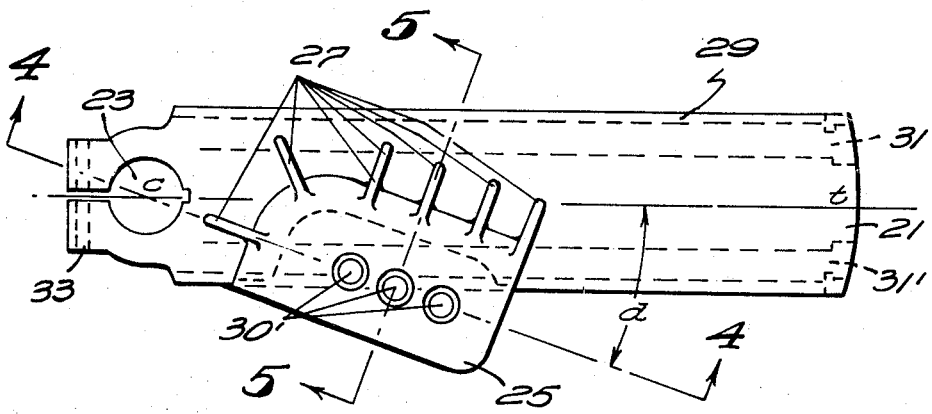
FIGURE 2 is a side elevation of an integral crank and counterweight arm constructed in accordance with the present invention.
Figure 3:
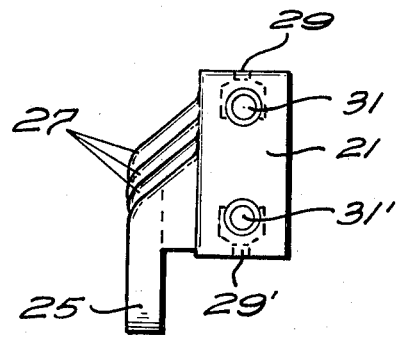
FIGURE 3 is a right hand end view of the same structure.
Figure 4:
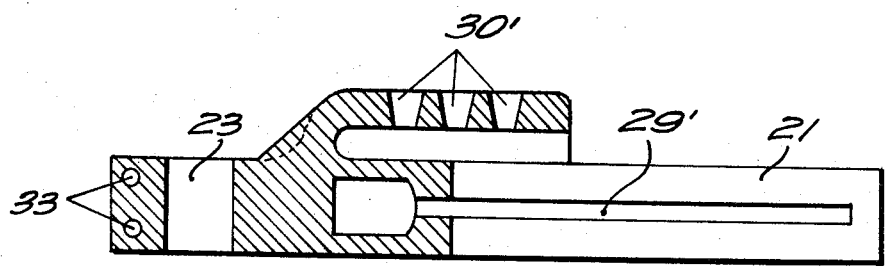
FIGURE 4 is a transverse sectional view along line 4—4 of FIGURE 2.

In accordance with the present invention there is provided an integral crank and counterweight arm especially designed so that in spite of a significant-sized acute angle of offset or rotational phasing between the position of the wrist pin fittings and the effective torque arm of the counterweights, complete and easy adjustment in radial distance of the counterweights from the crankshaft is still possible. As seen from the details of construction of a typical crank member as depicted in FIGS. 2, 3 and 4, the key feature of this invention is the division of the integral crank member into two branches having major sections lying in spaced-apart relationship. The first branch is elongated body portion 21 having a crankshaft fitting 23 near one end thereof and having undercut edge grooves or slots 29 and 29' therein for mounting counterweights thereon so their position therealong can be slidably adjusted. The edges of the elongated body portion 21 may be tapered as shown in FIG. 1 or parallel as shown in FIG. 2. The second branch is raised, rigid, skirt-like projection 25 having wrist pin fittings 30' located in the portion thereof which is spaced apart from the main body 21. This rigid skirt-like projection 25 is rigidly joined at its roots to one side face of the main body 21 in the vicinity of the crankshaft fitting 23 and rises from these roots to the spaced-apart portion which extends out so as to overhang somewhat the lower longitudinal edge of main body 21. The rigid joint between the two branches is best achieved by forming the entire integral structure shown as a single casting. However, it can also be accomplished by fabricating the two branches as separate parts and welding them together rigidly so that the roots of projection 25 are firmly implanted in the side face of main body 21. The skirt-like projection 25 could even be bolted rigidly to the side face of main body 21 but this is not recommended except as a possible method of providing an adjustable angular relationship between the wrist pin fitting locations and the effective torque arm of the counterweights. In any case, several rib braces 27 are preferably included at suitable points along the integral joint in order to provide adequate strength and rigidity to skirt-like projection 25.

Bolt holes 33 are provided at the crankshaft end of the crank member for use in anchoring the crank member on the shaft after it has been engaged by means of fitting 23. Openings 31 and 31' are suitably located in the other end of main body 21' to permit the insertion of lead screws or like mechanism (not shown) having the function of simplifying the longitudinal movement of the counterweights (not shown) after they have been slidably mounted by means of edge slots 29 and 29' whenever the position thereof is to be adjusted.

Before leaving FIGURES 2, 3 and 4 it should be noted that by virtue of the unique crank member construction described therein, inteference is avoided between the wrist pin fittings 30' and the edge slots 29 or 29' on which the counterweights are to be slidably mounted in spite of the fact that the said fittings 30' are located to give a significant acute angle of offset $a$ between the effective crank arm which lies along line 4—4 of FIG. 2 and line $c$–$t$, which represents the effective torque arm for the counterweights. In the particular embodiment shown in FIGURES 2, 3 and 4, the angle of offset $a$ is about 20°. However, it is obvious that the present invention could be of substantially equal merit for many other specific cases. For example, in certain types of oil well pumping units of special geometric design, such as those described in U.S. application 404,707 filed on Oct. 19, 1964, by Eyler et al., such a fixed rotational offset or angular phasing between the counterweight arm and the crank arm is sometimes desired. In such cases, the use of an integral counterweight and crank arm constructed in accordance with the present invention offers considerable advantage over the use of two separate arms mounted on the same crankshaft as disclosed in FIGURE 5 of said U.S. application 404,707.

Figure 5:
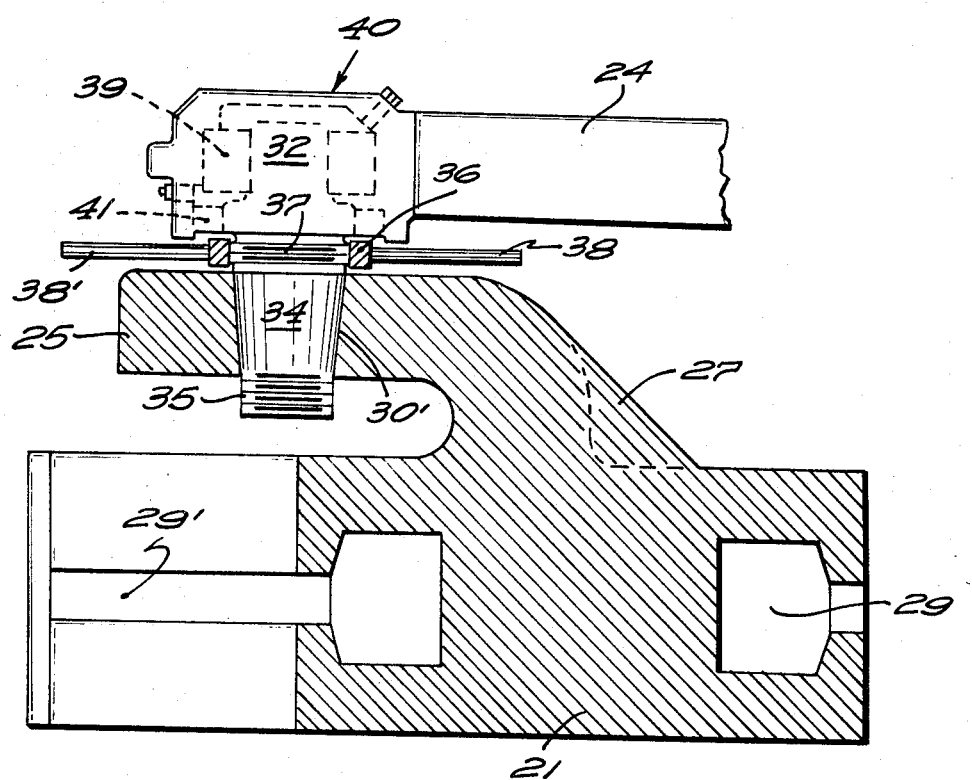
FIGURE 5 is an enlarged transverse sectional view along line 5—5 of FIGURE 2 with a view of the preferred wrist pin assembly superimposed thereon to illustrate the general manner of engagement and disengagement thereof.

Referring now to the enlarged view of FIG. 5 of the present application, it will be seen that the integral crank member of the present invention provides ample space for engagement of wrist pin assemblies in the wrist pin fittings without interference with the counterweights or the counterweight adjustment mechanism. Furthermore, with wrist pin assemblies of the preferred design as illustrated in said FIG. 5, the cooperation between respective elements is so excellent that engagement and disengagement thereof can be accomplished with exceptional ease and safety as will be seen from the following explanation.

FIGURE 5 shows the lower part of pitman 24 having wrist pin housing 40 depending therefrom together with related parts of the wrist pin assembly superimposed on an enlarged sectional view of the integral crank member as it would all appear in engaged position. The wrist pin 32 is suitably encased within the housing 40 by means of appropriate ring seal and bearings elements 41 and 39 respectively. A mid-section 34 of wrist pin 32 is suitably tapered to fit snugly in wrist pin fitting 30' in the skirt-like projection 25. Preferably, wrist pin 32 has an end portion 35 beyond said tapered mid-section by which it protrudes part way into the space between the main body 21 and the spaced-apart section of said skirt-like projection 25. As indicated in the drawing, this end portion 35 can be threaded so as to permit a nut (not shown) to be engaged therewith and thereby lock the wrist pin assembly in engaged position. Alternative methods of locking said wrist pin 32 in temporarily fixed engagement with skirt-like projection 25 can, of course, be used. Whatever locking device is employed for this purpose should be capable of being quickly removed, however, since there may be frequent occasion to change the location of the wrist pin 32 to a different one of the wrist pin fittings 30' located along line 4—4 of FIGURE 2. For example, such a change in wrist pin location is usually resorted to in order to change the stroke of a pumping unit of the type described in FIGURE 1. In order to facilitate such changes in wrist pin location with the apparatus of this invention, an additional threaded section 37 is provided on wrist pin 32 between housing 40 and tapered section 34. By threading onto this section 37 (before the wrist pin assembly has been engaged with a fitting 30' in skirt-like projection 25) a nut 36 having radial fingers 38 and 38' extending therefrom, the job of removing the wrist pin 32 from a fitting 30' can be greatly simplified. Thus, in order to remove the wrist pin 32, it is merely necessary to disengage the nut from threaded end section 35 and then, by tapping an accessible end of one of the said radial fingers 38' which extends beyond the edge of skirt-like projection 25, with a hammer or the like, cause nut 36 to gradually unwind from threaded section 37 and contact the surface of skirt-like projection 25. Continued tapping of fingers 38' or 38 as the nut 36 unwinds exerts sufficient force against said part 25 to release tapered section 34 of the wrist pin from its snug setting in said fitting 30' and cause it to be retracted therefrom. To assure that at least one of said radial fingers 38 or 38' is always conveniently accessible for tapping, at least three such radial fingers should be appended to nut 36 at substantially equidistant points around the periphery thereof. Preferably, 4 to 6 such radial fingers will be provided thereon. This method of retracting the wrist pin has been found to be not only more positive and convenient but also to involve less risk of damage to other parts of the equipment than trying to pry or knock the wrist pin from its fittings by the direct application of force to the relatively inaccessible end of the pin which protrudes through underneath the skirt-like projection 25.

Having described our invention together with preferred embodiments thereof, what we claim and desire to secure by U.S. Letters Patent is:

1. An integral crank and counterweight arm comprising a main elongated body portion having a crank shaft fitting near one end and a groove in either longitudinal edge for mounting counterweights thereon in slidably adjustable positions therealong and, rigidly joined to and firmly rooted in one side face of said main body portion near the crankshaft end thereof, a raised, rigid, skirt-like projection which rises from its firmly rooted connection with said body portion and translates into a major flat section which is spaced apart from said body portion and has fittings therein for attaching wrist pin assemblies thereto at a substantial acute angular crank position relative to the effective torque arm of said counterweights.

2. The integral crank and counterweight arm of claim 1 wherein the wrist pin fittings in said skirt-like projection comprise tapered holes at least one of which is located at least partly over a grooved portion of said main body portion.

3. The integral crank and counterweight arm of claim 2 in combination with a wrist pin assembly comprising a wrist pin tapered to fit said tapered holes, a threaded section on said pin located immediately adjacent to the part of said pin which mates with the large end of said tapered holes and a nut fitted to engage said threaded section and having at least three elongated fingers extending radially outwardly from approximately equidistant points on the periphery thereof.

4. The improved crank and wrist pin assembly combination of claim 3 in which the length and spacing of said fingers is sufficient to insure that the end of at least one said fingers extends beyond the edge of said skirt-like projection at all times, regardless of position of engagement of said wrist pin in any of said tapered hole fittings.

References Cited

UNITED STATES PATENTS

| | | | |
|---|---|---|---|
| 1,818,304 | 8/1931 | Chevalier | 74—600 |
| 1,931,861 | 10/1933 | Croom | 74—600 |
| 2,218,967 | 10/1940 | Athy et al. | 74—591 |

FRED C. MATTERN, *Primary Examiner.*

W. S. RATLIFF, *Assistant Examiner.*